United States Patent [19]
Bertero et al.

[11] Patent Number: 4,549,204
[45] Date of Patent: Oct. 22, 1985

[54] DIFFRACTION LIMITED IMAGING SYSTEMS

[75] Inventors: Mario Bertero, Viale Benedetto, Italy; Edward R. Pike, Malvern, England

[73] Assignee: The Secretary of State for Defence in Her Britannic Majesty's Government of the United Kingdom of Great Britain and Northern Ireland, London, England

[21] Appl. No.: 443,883

[22] Filed: Nov. 23, 1982

[30] Foreign Application Priority Data

Nov. 26, 1981 [GB] United Kingdom ............... 8135759
Mar. 9, 1982 [GB] United Kingdom ............... 8206923

[51] Int. Cl.⁴ .............................................. H04N 7/18
[52] U.S. Cl. ........................................ 358/93; 378/71
[58] Field of Search ............... 358/107, 93, 285, 106, 358/293, 294; 392/8, 43; 356/239; 378/70, 71

[56] References Cited

U.S. PATENT DOCUMENTS

| | | | |
|---|---|---|---|
| 3,409,872 | 12/1968 | Hogg et al. | 358/107 |
| 3,604,806 | 9/1971 | Redman | 250/550 |
| 3,835,247 | 9/1974 | Soames | 358/107 |
| 3,937,580 | 2/1976 | Kasdan | 250/550 |
| 4,121,247 | 10/1978 | Henry | 358/107 |
| 4,136,950 | 1/1979 | Labrum et al. | 358/107 |

FOREIGN PATENT DOCUMENTS

2095028 9/1982 United Kingdom .

OTHER PUBLICATIONS

Bertero M. and Pike, E. R., "Resolution in Diffraction-Limited Imaging, A Singular Value Analysis", Optica Acta, 1982, vol. 29, No. 6, pp. 727–746.

*Primary Examiner*—John C. Martin
*Assistant Examiner*—Edward L. Coles
*Attorney, Agent, or Firm*—Cushman, Darby & Cushman

[57] ABSTRACT

An imaging system for obtaining information within the diffraction limit comprises an illuminating source of radiation, e.g. a laser. A lens system focuses radiation from a small area of an object onto a detector array in an image plane. The detectors measure the amplitude of the received radiation giving a matrix of information. This matrix is then inverted by a computer to reconstruct the image for observation on a cathode ray tube. The object is scanned by scanning the radiation or stepping the object.

10 Claims, 2 Drawing Figures

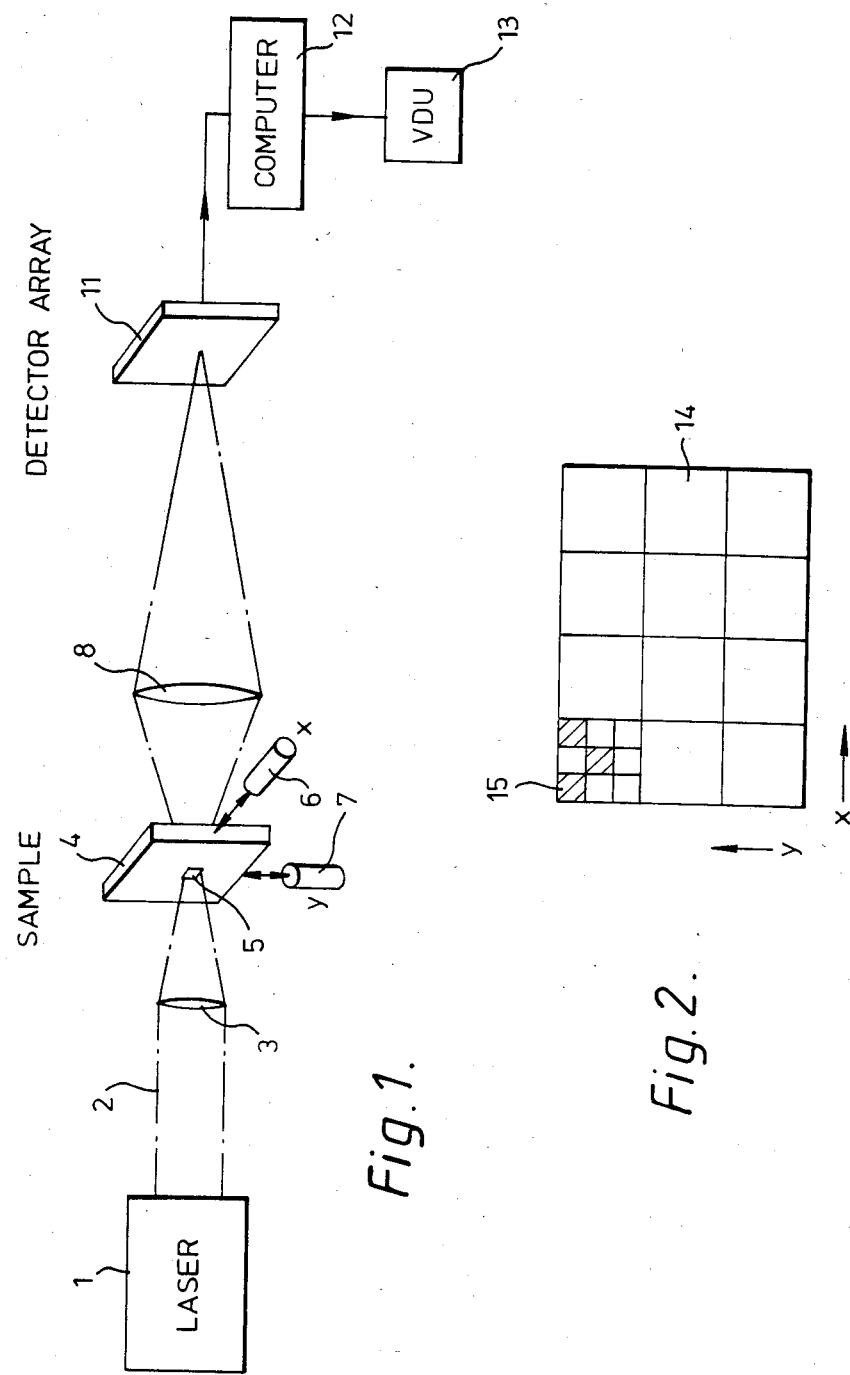

DIFFRACTION LIMITED IMAGING SYSTEMS

This invention relates to diffraction limited imaging systems.

Imaging systems are used to provide an image of an object. For example microscopes provide an enlarged image of a small object on an illuminated slide. To increase the magnification of image over object it is necessary to focus onto smaller sections of the object. The diameter of the resolved area of object is ultimately limited by diffraction in the imaging system used. The theoretical diffraction limit of resolution of a good optical microscope is $\lambda/2$ where $\lambda$ is the wavelength of radiation and is termed the Rayleigh criterion. The same limit arises in infra red imaging.

The problem of diffraction also arises in radar observation of aircraft, e.g. for air traffic control. The ability of an antenna system to resolve closely spaced aircraft is diffraction limited.

Again in acoustic detection of e.g. objects on the sea bed or in the acoustic microscope resolution is diffraction limited. When an image of an object is focussed by a lens system onto an image plane only part of the radiation information passing through the lens is focussed into the geometrical image. Information about the object is also present in the image plane outside the geometrical image and is normally not used. For objects whose size is well above the diffraction limit this unused information is insignificant. However, for objects whose size is near the diffraction limit, this extra information forms a significant part of the total information passing through the lens system.

The present invention utilises this previously unused information, i.e. the diffraction pattern outside the geometric image together with the geometrical image information, to obtain information about objects whose size is around the diffraction limit.

According to this invention an imaging system comprises a lens system for focussing coherent or incoherent radiation onto an image plane, detectors for measuring the amplitude of the radiation in the image plane to obtain a matrix of information, means for inverting this matrix to give an image reconstruction, and means for observing the reconstructed image.

The imaging system may operate with electromagnetic radiation e.g. at radar or visible frequencies, electron beams, or acoustic radiation, with appropriate lens systems. However, at visible frequencies the detectors normally only measure the intensity of the image and in this case further means must be provided to deduce the amplitudes and phases.

The detectors for visible light may be an array of photodetectors or the target of a photoconductive electron tube as in television cameras, scanned electronically with a dominant reference beam to give the necessary phase information as in holography or alternatively by use of the exponential filter method of Walker (U.K. Patent Application No. 81 08244) or, more simply, if the object may be assumed real, by making use of the unique relationship between image and object even when the intensity only is known.

The reconstructed image may be observed on a cathode ray tube, photographic film, or graphically or numerically on paper.

To obtain an overall image of a large object the lens system may scan the object. In this case the reconstructed image is the sum of reconstructed scanned areas.

For an imaging system using visible light i.e. a microscope the object may be illuminated by a beam of coherent laser radiation. The beam may be focussed to illuminate an area of about one half wavelength in diameter, or illuminated coherently or incoherently through an aperture of about one half wavelength diameter or square.

In the case of radar systems aircraft are illuminated by coherent radiation. For aircraft spaced apart greater than the diffraction limit of the receiving antenna no resolution improvement is needed and the receiver operates in a normal mode. However in the diffraction limit returns from closely spaced aircraft are processed according to the invention.

The invention will now be described by way of example only with reference to the accompanying drawing in which:

FIG. 1 is a schematic view of a microscope in which a sample is stepped across a laser beam to provide a scanned object;

FIG. 2 is a mosaic of reconstructed images.

As shown in FIG. 1 a super-resolution microscope comprises a laser 1 or other light source whose output beam 2 is focussed by lenses 3 onto a sample 4 to be measured. The laser 1 may be a HeNe operating at 633 nm or a suitable ultra-violet laser line. The light 2 is focussed to an area 5 less than 1 e.g. about $\frac{1}{2}$ wavelength across: alternatively a stop having a $\frac{1}{2}$ wavelength square aperture may be used.

The sample 4 is mounted for x, y movement perpendicular to the illumination by stepper motors 6, 7 or by suitable sawtooth or sine wave scanning mechanisms.

Light transmitted through the sample is collected and focussed by a microscope lens system 8 onto a $10 \times 10$ array of detectors 11. Each detector thus received light from a different part of the illuminated sample, a sample element 5.

Output from each detector in the array 11, a matrix of information, is fed to a computer 12 which processes this matrix for display on a visual display unit 13 e.g. a cathode ray tube, photographic film, or paper chart.

In FIG. 2 the 12 larger squares 14 each represent an illuminated sample element 5. The complete image as shown is the result of four x-stepped positions of the sample 4 and three y-stepped positions. A normal microscope cannot resolve any detail in each sample element 5 i.e. a $\lambda/2$ square. Thus each square 14 would be displayed as an average illumination intensity level. Within each of these larger squares 14, using the processing of this invention, it is possible to say provide nine sub-elements 15, each sub-element 15 having a uniform intensity level. Considerably more detail is thus available from the whole sample than is possible with a conventional microscope. The information from each sample element is stored in the computer until the whole sample has been processed. The total sample can then be observed.

In operation a thin slice 4 of material to be examined is placed on a microscope slide and placed in a sample holder. This holder is stepped in $\lambda/2$ steps in the x and y directions as required.

Laser light 2 is focussed onto a $\lambda/2$ square portion of the sample; the illuminated sample forms a sample element 5.

The sample element 5 is imaged onto the whole of the detector array 11. Output from each detector element is fed to the computer 12 where an inversion of the matrix information is computed and fed to the visual display unit 13. The sample 5 is stepped by a λ/2 step and the process repeated. This step and process procedure is repeated until the whole sample 4 has been examined. The result is a high definition image of the sample.

The above procedure is also applicable to reflecting mode microscopy as well as the transmission mode described above.

To assist improving image definition in the presence of noise the sample may be stepped by fractions of a wavelength and the multiple images produced integrated.

Consider the simplest case only where the object may be assumed to be real. In this case the amplitude of the image is the square root of the intensity and the phase is either 0 or $\pi$ By using the continuity of the derivative the phase may be determined by alloting it 0 at the centre of the image and alternately $\pi$ and 0 thereafter proceeding outwards as zeroes of intensity are successively crossed. This may also be done by the mathematical technique of analytic continuation if necessary.

The theoretical basis for the matrix transformations of the derived complex amplitudes is then as follows:

If we denote by $\underline{x}=\{x_1,x_2\}$ a point in the object and if the complex amplitude of the object f(x) is different from zero only over the illuminated or delimited region D, then the image is given by $$(Kf)(\underline{x}) = \iint_D S(\underline{x} - \underline{y})f(\underline{y})d\underline{y}$$

where $$S(\underline{x}) = \frac{1}{(2\pi)^2} \iint_P e^{i(\underline{x},\underline{\omega})} d\underline{\omega}$$

for coherent illumination or $$S(\underline{x}) = \frac{1}{(2\pi)^2} \left| \iint_P e^{i(\underline{x},\underline{\omega})} d\underline{\omega} \right|^2$$

for incoherent illumination

P being the bounded domain in Fourier space corresponding to the spatial frequencies transmitted by the lens.

A linear least squares fit of the object to the image is found by computer inversion of the digitised normal equations.

$$\sum_{n_1 n_2 p_1 p_2} S_{n_1 n_2 m_1 m_2} S_{n_1 n_2 p_1 p_2} f_{p_1 p_2} = \sum_{q_1 q_2} S_{m_1 m_2 q_1 q_2} g_{q_1 q_1}$$

where $$S_{abcd} = S(\{a,b\} - \{c,d\})$$

and $$f_{ab} = f(\{a,b\}) g_{ab} = g(\{a,b\})$$

In practice $p_1$ and $p_2$ will range over a much smaller number of points than $q_1$ and $q_2$.

The vector x represents a point $\{x_1, x_2\}$ in the object (sample 4) plane, the vector y represents a point $\{y_1, y_2\}$ in the image (on detector 11) plane, $\{p_1, p_2\}$ are sample values of $\{x_1, x_2\}$ $\{q_1, q_2\}$ are sample values of $\{y_1, y_2\}$.

For coherent illumination the function S(x) can be shown to be $$S(\underline{x}) = \frac{\sin(\Omega x_1)}{\pi x_1} \frac{\sin(\Omega x_2)}{\pi x_2},$$

for a square object with square pupil defined by $$= [-\Omega, \Omega] \times [-\Omega, \Omega]$$

For a circular object and a circular pupil of radius $\Omega$ in frequency $$S(\underline{x}) = \frac{\Omega}{2\pi} \frac{J_1(\Omega|\underline{x}|)}{|\underline{x}|}$$

For incoherent illumination the analogous expressions are, for the square object $$S(\underline{x}) = \frac{\sin^2(\Omega x_1)}{\pi \Omega x_1^2} \frac{\sin^2(\Omega x_2)}{\pi \Omega x_2^2}$$

and for the circular object $$S(\underline{x}) = FT \left\{ \frac{2}{\pi} \left[ \cos^{-1}\left(\frac{|\omega|}{2\Omega}\right) - \left(\frac{|\omega|}{2\Omega}\right) \sqrt{1 - \left(\frac{|\omega|}{2\Omega}\right)^2} \right] E_P\left(\frac{\omega}{2}\right) \right\}$$

where FT denotes the Fourier Transform and $E_P = 1$ on the pupil and zero elsewhere.

An alternative algorithm for reconstructing the object from the array of detector outputs sampling the image makes use of the singular system $\{u_k, v_k; \alpha_k\}_{k=0}^\infty$ of the transformation from the continuous object f, over its known support, to the "vector" image, $g_n$, defined by the (N) complex data samples on the finite set of detectors. The reconstruction is then performed by the operation $$f = \sum_{k=0}^{K} \frac{(g, v_k)}{\alpha_k} u_k, (g, v_k) = \sum_{n=1}^{N} w_n g_n (v_k)_n$$

where (g, $v_k$) is the scaler product or projection of the data on the singular vector $v_k$. The singular system will be a function of the experimental disposition but may be calculated by numerical techniques according to known practice in the art of numerical analysis in any particular case. K is an upper limit to the number of components which may be recovered, determined by the rate of decrease of the singular values $\alpha_k$ and the actual level of noise present. The $w_k$ are suitable weights which take into account possible non uniform detector spacing.

Resolution in diffraction limited imaging is described in OPTICA ACTA 1982 vol. 29, No. 6, 727–746.

We claim:

1. An imaging system for examining object details having a size approximating the diffraction limit of said imaging system comprising:

means for illuminating a small area of an object with radiation;

a lens system for focusing the illuminated area of said object onto an image plane to give both a geometric image and a diffraction pattern of the object;

detector means for measuring the intensity or amplitude of the geometric image and diffraction pattern radiation in the image plane to obtain a matrix of information; and means connected to said detector means for inverting said matrix of information thereby generating an information signal for reconstructing an image of said illuminated area containing details of the object.

2. An imaging system according to claim 1 further including means for reconstructing said image for observation.

3. The system of claim 2 wherein said lens system illuminates an area less than one wavelength of the illuminating radiation across.

4. The system of claim 3 and including means for scanning the illuminating radiation relative to the object.

5. The system of claim 4 wherein the scanning includes motors for moving the object in discrete steps.

6. The system of claim 3 including a laser for illuminating the object.

7. The system of claim 3 wherein the lens system receives radiation transmitted through the object.

8. The system of claim 3 wherein the lens system receives radiation reflected off the surface of the object.

9. The system of claim 3 wherein the detectors are discrete detectors arranged in a matrix array.

10. The system of claim 3 wherein the detectors are formed by a target in a photo conductive electron tube.

* * * * *